Dec. 11, 1951  A. F. MEYER  2,578,440
UTILITY CART
Filed May 23, 1950
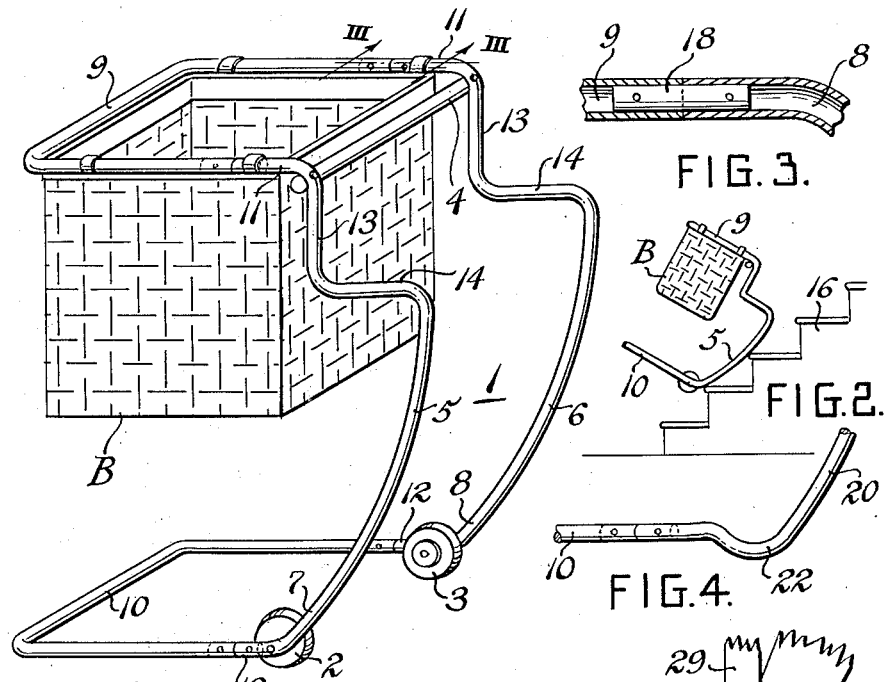
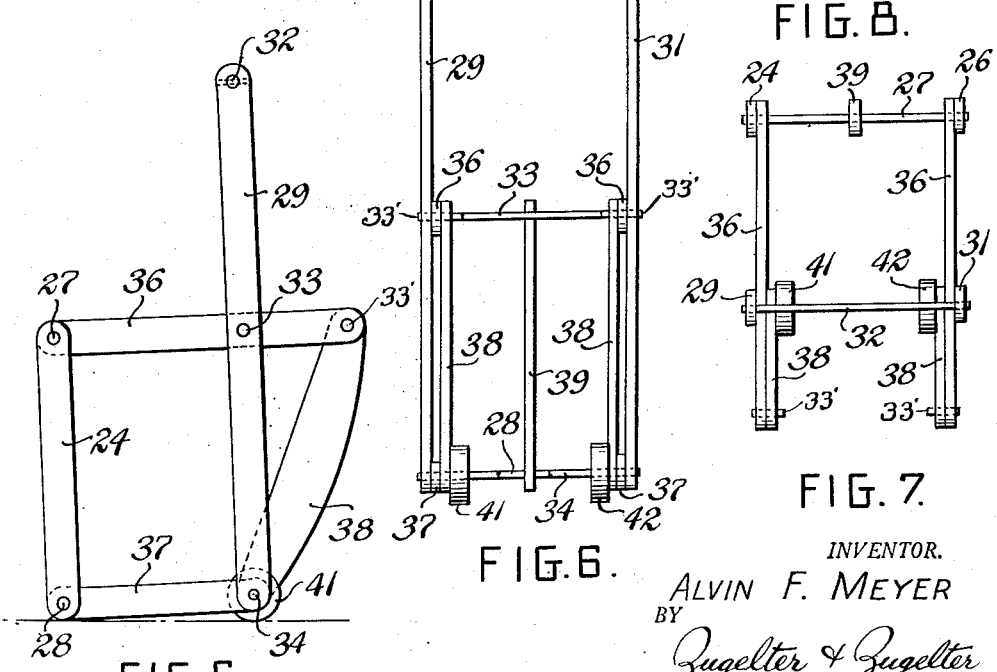
INVENTOR.
ALVIN F. MEYER
BY
Zugelter & Zugelter
Attys.

Patented Dec. 11, 1951

2,578,440

UNITED STATES PATENT OFFICE 2,578,440

UTILITY CART

Alvin F. Meyer, Cincinnati, Ohio

Application May 23, 1950, Serial No. 163,632

1 Claim. (Cl. 280—5.24)

This invention relates to a utility cart which can be transported on floors or walks and also up or down stairs without bumping.

An object of this invention is to provide a utility cart having means whereby it can be moved over floors or walks and means whereby it can be slid up and down stairs without bumping on the stair treads.

A further object of this invention is to provide a utility cart having sled runners so designed that they are always in contact with the edge of at least one stair tread, thereby eliminating bumping of the cart as it is moved up or down stairs.

A further object of this invention is to provide a cart of this type which can stand alone on a flat surface and which can be rolled on the flat surface.

A further object of this invention is to provide a cart of this type which may be collapsed and folded into a compact unit so that it may be stored in a small space when desired.

The above and other objects and features of the invention will in part be apparent and will in part be obvious from the following detailed description, and the drawing, in which:

Figure 1 is a perspective view of a utility cart constructed in accordance with an embodiment of this invention;

Fig. 2 is a view in side elevation of the cart showing the cart in position for sliding up or down a stair;

Fig. 3 is an enlarged fragmentary view in section taken on line III—III in Fig. 1;

Fig. 4 is an enlarged fragmentary view of a skid which can be substituted for the wheels of the embodiment shown in Fig. 1;

Fig. 5 is a view in side elevation of a utility cart constructed in accordance with another embodiment of this invention;

Fig. 6 is a view in rear elevation of the cart illustrated in Fig. 5;

Fig. 7 is a top plan view of the cart illustrated in Figs. 5 and 6; and

Fig. 8 is an enlarged fragmentary view in side elevation showing a skid which may be substituted for the wheels of the embodiment shown in Figs. 5 to 7 inclusive.

In the following detailed description, and the drawing, like reference characters indicate like parts.

In Fig. 1 of the drawings a utility cart 1 is shown having wheels 2 and 3 and a handle 4 by means of which the cart may be handled or maneuvered. The cart is provided with means for supporting a basket or container B in which groceries, laundry or the like may be placed and transported on the cart.

In order that the cart may be transported up or down stairs smoothly and without bumping from the edge of one stair tread to another, the cart is provided with runners or skids 5 and 6. As shown in Fig. 2, the runners 5 and 6 are so shaped that they can engage the edges of two stair treads part of the time and are in firm contact with the edge of a stair tread all the time, while the cart is being negotiated either up or down a stair.

The construction of the cart shown in Fig. 1 comprises spaced side frame members 7 and 8, that are connected at their upper and lower ends by forwardly extending U-shaped frame members, 9 and 10, respectively. Preferably the side members 7 and 8 are similar in shape as are the frame members 9 and 10 as manufactured is simplified.

In the form shown in Fig. 1, the side frame members 7 and 8 and the frame members 9 and 10 are made of tubular material such as metal tubing. The side frame members are so shaped or formed that they are provided with relatively short forwardly projecting portions 11 and 12 at the tops and bottoms thereof, respectively. Immediately to the rear of top portion 11, each side frame member is bent to form a portion 13 which extends downwardly therefrom and a rearwardly extending portion 14. The rear end of each portion 14 connects with the top of the runner portion of the side frame member.

The runners are arched rearwardly and downwardly so that when the cart is drawn up a stair 16 (Fig. 2) the runners engage the edges of the treads of the stair. The runners are of sufficient length to span adjacent treads so that the cart can slide smoothly from tread to tread as it rides up and down the stair.

As shown in Figs. 1 and 2, handle 4 extends between the top portions of the side frame members above and in front of the upper end of the runners. When the cart is drawn up the stair by handle 4, the cart automatically assumes the position shown in Fig. 2 in which the runners engage the edges of the treads but the wheels are free of the treads.

As already pointed out, upper and lower U-shaped frame members 9 and 10 are attached to upper and lower ends of the side frame members respectively. As shown in Fig. 3, ends of the tubular side frames and upper and lower frames telescope over insert rods 18 to which the ends of the tubular members are attached by rivets, pins, bolts, or the like which hold the frame members of the cart in assembled relation.

As shown in Fig. 1, upper frame member 9 is directly above lower frame member 10 when the cart is at rest in an upright position, and the lower frame member forms a stand or base for the cart.

Each of wheels 2 and 3 is journalled on one of the side frame members at the bottom of the runner portion thereof. The wheels provide a rolling support for the cart when on a floor or other level surface. However, when the cart is negotiated up or down stair 16, as shown in Fig. 2, the wheels are out of contact with the stair treads, and the cart slides on the runners. However, when the cart reaches the floor at the top or bottom of the stair, the cart slides from the runners onto the wheels.

Each of the wheels may be replaced by a skid for sliding the cart upon a floor or walk. As shown in Fig. 4, the lower portion of each side frame member may be of the form indicated at 20 and may extend below the plane of lower frame member 10 being rounded to form a skid 22. The skids take the place of the wheels of the cart shown in Figs. 1 and 2 for supporting the cart on the level.

A cart is shown in Figs. 5 to 7 inclusive which embodies another form of the invention. This cart is particularly adapted for construction from wood. The cart shown in Figs. 5 to 7 includes a pair of short or forward uprights 24 and 26 spaced by dowels 27 and 28 and a pair of elongated or handle carrying uprights 29 and 31 which are spaced by dowels 32, 33, and 34. Each of the elongated uprights is disposed to the rear of one of the forward uprights and is connected thereto by an upper cross link 36 and a lower cross link 37. As shown in Figs. 5 and 7, the upper cross links extend rearwardly of the elongated uprights. The rear ends of the upper and lower cross links are connected by runner links 38 which are curved rearwardly and downwardly as shown in Fig. 5 so that they can engage the edges of stair treads as the cart is negotiated up or down stairs. The dowel 32 at the top of the elongated uprights forms a handle by means of which the cart can be maneuvered.

The upper cross links form a support upon which a load may be mounted. The load preferably is mounted on the upper cross links in front of the elongated uprights. As shown in Figs. 5 and 7, the forward portion of the cart may be reinforced by a middle upright 39 extending between dowels 27 and 28.

As shown in the drawing, a pair of wheels 41 and 42 are journalled upon dowel 34 at the lower ends of the runner links. The cart may be rolled on a flat surface upon wheels 41 and 42. The wheels, however, are out of the way when the cart is drawn up a stair.

The cart illustrated in Figs. 5 to 7 may be modified to substitute a skid for each of the wheels. As shown in Fig. 8, each of the runner links may be of the form indicated at 43. The lower end of runner link 43 is enlarged and rounded to form a skid 44 which extends below lower link 37. The skids take the place of the wheels of the cart shown in Figs. 5 to 7 for supporting the cart on the level.

The cart illustrated in Figs. 5 to 7 inclusive is collapsible so that it can be stored in a small space when not in use. Dowel 33' may be removable. When dowel 33' is removed, links 36 and 37 can be folded toward each other and into substantial alignment with the runner links and uprights so that the cart can be stored in a small space. If desired, all of the dowels may be removable so that the cart can be knocked down for storage in an even smaller space.

Each of the carts of this invention can be used to move a load up and down a stair without bumping. The runners span adjacent treads of the stair and slide from the edge of one tread to the edge of the next tread without coming free of the stairs so that the cart rides smoothly up and down the stair. When the cart reaches the top or bottom of the stair, it can be slid or rolled onto the level floor.

The embodiments of the invention described above and illustrated in the drawing are subject to structural modification without departing from the spirit and scope of the appended claims.

Having described my invention, what I claim as new and desire to secure by Letters Patent is:

A utility cart comprising a frame, said frame including a pair of spaced parallel side members, at least a portion of each side member being convex downwardly and rearwardly and of such length that when the cart is pulled rearwardly up a stair, the convex portions slide on the outermost edges of the treads of the stair without bumping, the convex portions being adapted to span the edges of adjacent treads, upper and lower ends of said side members being turned forwardly and parallel to each other, an upper U-shaped member extending forwardly of and connecting the upper ends of the side members, and a lower U-shaped member parallel to the upper U-shaped member and connecting the lower ends of the side members and extending forwardly thereof beneath the upper U-shaped member, means for hanging a container from the upper U-shaped member, means on the lower ends of the side members extending below the plane of the lower U-shaped member, the cart being adapted to stand on said means and on the cross bar portion of the lower U-shaped member with the upper U-shaped member spaced from and directly above the lower U-shaped member, and a rigid handle attached to and extending between upper ends of the side members, said handle holding the side members in spaced relation.

ALVIN F. MEYER.

REFERENCES CITED

The following references are of record in the file of this patent:

UNITED STATES PATENTS

| Number | Name | Date |
| --- | --- | --- |
| 2,531,520 | Lankford, Jr. | Nov. 28, 1950 |